May 31, 1966  J. S. CONNORS  3,253,390
DEHYDRATION OF GASES AND REGENERATION OF DESICCANT
Filed July 29, 1963
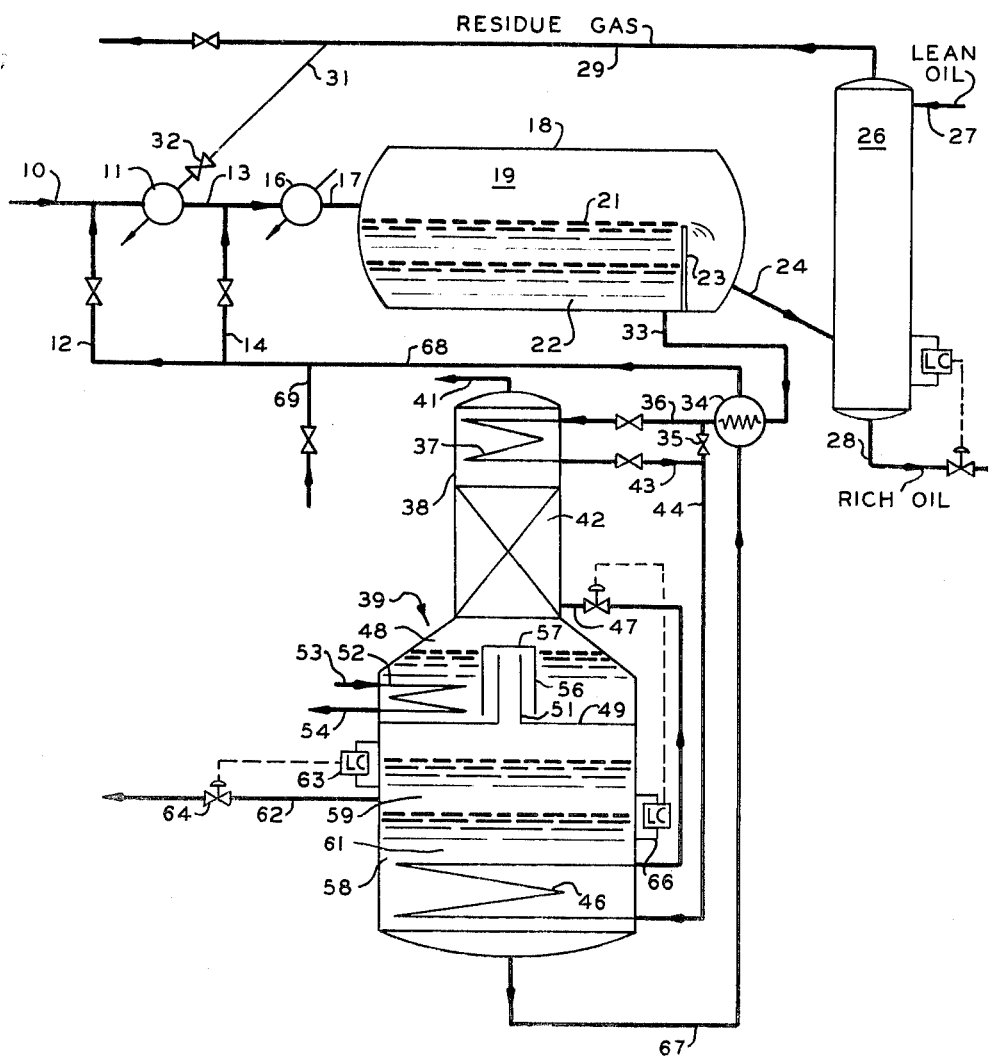
INVENTOR.
J.S. CONNORS
BY
ATTORNEYS

United States Patent Office

3,253,390
Patented May 31, 1966

3,253,390
DEHYDRATION OF GASES AND REGENERATION
OF DESICCANT
James S. Connors, Bartlesville, Okla., assignor to Phillips
Petroleum Company, a corporation of Delaware
Filed July 29, 1963, Ser. No. 298,234
5 Claims. (Cl. 55—32)

This invention relates to the dehydration gases. In one aspect this invention relates to the dehydration of gases employing a liquid desiccant, and the regeneration of said desiccant.

Natural gas, while usually composed predominantly of methane, also usually contains appreciable quantities of easily liquefied petroleum gases (LPG), and frequently contains significant quantities of higher boiling normally liquid hydrocarbons having up to 10 to 15 or more carbon atoms per molecule.

The processing of natural gas to recover therefrom said normally liquid hydrocarbons and the relatively easily liquefied petroleum gases (LPG) has developed into a very important factor in the nation's economy. In the early days of the industry the first plants for so processing natural gases were designed to recover only the gasoline components, i.e., those components which were normally liquid at ordinary conditions of temperature and pressure, or which were liquid at pressure slightly above atmospheric. As the industry developed, the plants were designed to recover the $C_4$ hydrocarbons, such as butane, and today substantially all of the butane is recovered. In recent years the demand for liquefied petroleum gases has increased to the point where more and more of the $C_3$ hydrocarbons, e.g., propane, are being recovered. Today, recovery of 80 to 85 percent of the propane in natural gas is common. In still more recent years, the recovery of the $C_2$ hydrocarbons, e.g., ethane, has become increasingly important because of the use of said $C_2$ hydrocarbons as starting materials in a great number of petrochemical processes.

As the demand for the $C_2$ and $C_3$ hydrocarbons has increased, the plant operators have increased the operating pressure and have applied more refrigeration in the absorption plants to increase the recovery of said $C_2$ and $C_3$ hydrocarbons. In some such processes, not only is the hydrocarbon absorbent cooled, but the gas being treated is also cooled prior to being contacted with said adsorbent. This cooling of the gas has encountered difficulties due to hydrate formation because natural gas flowing from wells is ordinarily saturated with water. These hydrates impede the free passage of the gas along transfer lines and particularly through constrictions such as in the heat exchange apparatus employed in cooling the gases. Usually, the first hydrate formation is small but as the hydrate is formed it acts as seed for further accumulation which grows to such an extent that free passage of the gas is seriously impeded and often ultimately stopped.

A known method of removing moisture from natural gas so as to prevent hydrate formation comprises contacting said gas with a liquid desiccant, such as an alkylene glycol. Said desiccant is usually thereafter regenerated or revivified by heating in a rectifier or reflux column to remove the acquired moisture. After being regenerated the desiccant can be recycled and used for further moisture removal.

This treatment for dehydration of gases with a suitable liquid desiccant has come to be rather commonly employed. In many systems the process operates quite satisfactorily without difficulties. However, in a considerable number of fields where the gas contains a significantly greater proportion of the higher boiling normally liquid hydrocarbons, and particularly aromatic hydrocarbons, it has been found that the liquid desiccant absorbs an appreciable amount of said higher boiling hydrocarbons. When the liquid desiccant containing these dissolved or absorbed higher boiling hydrocarbons is regenerated, said higher boiling hydrocarbons are desorbed therefrom. Since said hydrocarbons are of lower density than the desiccant, they build up as a layer on top of the desiccant in the regeneration equipment such as in the reboiler and/or the regenerated desiccant accumulator. Said separated higher boiling hydrocarbons are ultimately withdrawn with the regenerated desiccant and contaminate same resulting in reduced efficiency when the regenerated desiccant is recycled to the dehydration step. In some instances, the amount of higher boiling hydrocarbons so separated and accumulated and recycled with the desiccant has been so great and the problem has been so severe as to require periodic shutdown of the regeneration equipment to dispose of said hydrocarbons.

The present invention provides a method for overcoming the above-described difficulties. In the practice of the present invention, the higher boiling normally liquid hydrocarbons which are desorbed and separated from the wet or spent desiccant are withdrawn from the desiccant reboiler and/or accumulator as a separate stream, thus making possible smoother and continuous operation of the desiccant regeneration equipment. Thus, broadly speaking, the present invention resides in a combination of steps comprising contacting a moisture-laden gas with a liquid desiccant to remove the moisture therefrom, heating the wet or spent desiccant in a regeneration zone to regenerate same by driving water vapor therefrom, separating desorbed higher boiling hydrocarbons and regenerated liquid desiccant, withdrawing said desorbed hydrocarbons and said regenerated desiccant from said regeneration zone as separate streams, and recycling the regenerated liquid desiccant back to said contacting step; and a combination of apparatus for carrying out said combination of steps.

An object of this invention is to provide an improved process for the dehydration of gases. Another object of this invention is to provide an improved method for regenerating a spent or wet liquid desiccant. Still another object of this invention is to provide an apparatus for dehydrating moisture-laden gases by contacting same with a liquid desiccant and regenerating said liquid desiccant. Other aspects, objects and advantages of the invention will be apparent to those skilled in the art in view of this disclosure.

Thus, according to the invention, there is provided a process for the dehydration of gases containing moisture, which process comprises: mixing said gases with a liquid desiccant to form a mixture; cooling said mixture to a temperature sufficient to cause condensation of a portion of said gases and form a condensate; passing said cooled mixture to a phase separation zone and therein separating same into a substantially dry gas phase, a condensate phase, and a wet desiccant phase containing dissolved hydrocarbons; passing said wet desiccant phase to a desiccant regeneration zone; in said regeneration zone, applying sufficient heat to said wet desiccant phase to cause separation of dissolved hydrocarbons and water vapor therefrom and produce a liquid hydrocarbon phase and a regenerated desiccant phase; withdrawing said hydrocarbon phase and said regenerated desiccant phase from said regeneration zone as separate streams; and recycling said regenerated desiccant to said mixing step.

Further according to the invention, there is provided a combination of apparatus which can be employed for carrying out the above-described method.

Referring now to the drawing, the invention will be more fully explained. Said drawing is a diagrammatic flow sheet illustrating various embodiments of the method of the invention and schematically illustrating a combination of apparatus which can be employed in the practice of the invention. Many valves, pressure gauges, pumps, control apparatus, etc., not necessary for explaining the invention to those skilled in the art, have been omitted for the sake of brevity.

The description of the apparatus elements of the drawing will be combined with the explanation of the operation of the process. In said drawing a moisture-containing feed gas, such as a natural gas from a well not shown, is passed through conduit 10 into heat exchanger or chiller 11. Prior to introduction into said heat exchanger a liquid desiccant from conduit 12 is mixed with said gas in conduit 10 and contacts said gas during its passage through and during the cooling in said chiller 11. The partially cooled gas is passed from chiller 11 via conduit 13 wherein it is mixed and contacted with an additional quantity of said liquid desiccant which is introduced from conduit 14. The resulting mixture is then introduced into and passed through heat exchanger 16 wherein it is further cooled. In said chillers 11 and 16 the temperature of said gases can be reduced to any desired operating temperature. Usually said gases will be cooled to a temperature which is sufficient to condense a portion of said gases and form a condensate. While two chillers have been illustrated, it is within the scope of the invention to employ only one chiller or more than two chillers. The chilled gas and liquid desiccant are passed via conduit 17 into separator 18 wherein a separation into three phases is effected, i.e., a substantially dry gas phase 19, a hydrocarbon or condensate phase 21, and a liquid desiccant phase 22 containing dissolved water and hydrocarbons.

In said separator 18 the gas phase and condensate phase pass over weir 23 and flow through conduit 24 into an absorption zone represented by absorber 26. Flow through conduit 24 is by gravity and said conduit 24 is of such size as to accommodate liquid flow along the bottom thereof and vapor flow in the upper part thereof. In said absorption zone the dry gases are contacted countercurrently with a lean absorption oil introduced via conduit 27. Said absorption oil can be any suitable oil known in the art for absorbing hydrocarbons such as ethane, propane, and butane from a mixture of gases such as natural gas. The rich absorption oil containing the absorbed hydrocarbons is removed from absorption zone 26 via conduit 28 and passed to stripping apparatus (not shown) for recovery of the absorbed hydrocarbon in known and conventional manner and the lean absorption oil is recycled via said conduit 27. A residue gas comprising unabsorbed hydrocarbons is withdrawn from absorption zone 26 via conduit 29 and passed to a pipeline for distribution, to storage, or other use. If desired, a portion of said residue gas can be passed via conduit 31 and a suitable expansion valve 32 into said heat exchanger 11 as the refrigerant employed therein. It will be understood that said absorption zone, while here illustrated as a single absorber 26, can comprise any suitable number of absorbers operated either in parallel or in series.

The desiccant phase from separator 18 is passed via conduit 33, heat exchanger 34, and conduit 36 into heat exchange coil 37 positioned in the tower portion 38 of regeneration vessel 39. In the practice of the invention, the desiccant passing through coil 37 will remove heat from the water vapor passing upwardly through tower 38 around said coil 37 and ultimately out of said tower via conduit 41. This creates a reflux for wetting down of the packing 42 in tower portion 38 and prevents desiccant vapors from being removed via conduit 41 along with water vapor. If desired, it is within the scope of the invention to pass all of the desiccant from conduit 33 directly into conduit 44. Usually, however, from 15 to 70 volume percent of the desiccant in conduit 33 is passed through said coil 37 by proper control of valve 35. The wet desiccant from coil 37 is passed via conduit 43 into conduit 44, through heat exchange coil 46 located in the lower portion of vessel 39, conduit 47, and is introduced into the packed section of said tower portion 38. The packing 42 in said tower portion 38 can be any suitable type of vapor-liquid contact material such as Raschig rings, Burl saddles, etc. It is also within the scope of the invention to employ other vapor-liquid contacting means such as bubble cap trays.

Said desiccant passes downwardly into intermediate section 48 of vessel 39 which is formed by means of partition 49 and riser or downcomer pipe 51 which surrounds a downcomer opening in 49. Said section 48 contains a heat exchanger or heating coil 52 to which steam or other heat exchange medium is introduced via conduit 53 and removed via conduit 54. Said coil 52 supplies heat to boil the water out of the desiccant in section 48. Said riser or downcomer pipe 51 extends upwardly to a level which is desirably above the level of heating coil 52 and thus serves to maintain a level of liquid desiccant in section 48 which covers heating coil 52. A pipe 56, covered at its upper end by means of cap 57, surrounds pipe 51 and provides communication between the bottom of section 48 and the upper end of pipe 51. Said cap 57 prevents downflowing desiccant from tower portion 38 entering pipe 51. Although not shown in the drawing, it will be understood that cap 57 is provided with a vent hole in the top thereof, or is fixed to pipe 56 in a manner to permit equalization of pressure between sections 48 and 58 of vessel 39. The arrangement of pipes 51 and 56 permits the most concentrated desiccant to be drawn off from the bottom of section 48 and by overflow passed through pipe 51 into the lower surge or accumulator section 58 in the lower portion of vessel 39.

When the desiccant in section 48 is heated the dissolved or absorbed higher boiling hydrocarbons contained therein are desorbed. It will be noted that by the use of pipes 51 and 56 there is accomplished a downflow of liquid passed heat exchanger coil 52. This gives a very efficient heat exchange and allows the drawing off of the most concentrated desiccant from the bottom of section 48. It will be understood by those skilled in the art in possession of this disclosure and having studied the same that several pipes 51 and 56 can be provided in section 48. It is within the scope of the invention to modify pipes 51 and 56 to remove regenerated desiccant from any level within section 48. Several removal levels can be operated at one time depending upon the particular type of heating, degree of turbulence, or convection, etc.

Desorbed higher boiling hydrocarbons from phase 59 are withdrawn via conduit 62. In accordance with the invention, the rate of withdrawal of said hydrocarbons and the level of same in section 58 is controlled by means of liquid level controller 63 which is operatively connected to control valve 64 in said conduit 62. Liquid level controller 66 maintains a constant level of regenerated desiccant in section 58 by controlling the amount of wet desiccant passed through conduit 47 and introduced into vessel 39. It will be noted that by the arrangement of liquid level controllers 63 and 66, section 58, of said regeneration vessel serves as an accumulator for both the liquid hydrocarbon phase 59 and the regenerated desiccant phase 61. Also, that separator 18 serves as a surge vessel for wet desiccant and permits said wet desiccant phase and said condensate phase to come to equilibrium.

Lean regenerated desiccant is withdrawn from lower section 58 via conduit 67, heat exchanger 34, and passed via conduit 68 into said conduits 12 and 14 for mixing with the moisture-containing feed gas as described above. Make-up desiccant can be introduced into the system via conduit 69.

One requirement of a desiccant obviously is that it must be relatively inert to the gas being treated. Likewise, the desiccant preferably should be noncorrosive to conventional steel equipment so that special chemically resistant equipment need not be used. Any suitable liquid desiccant meeting the above requirements can be employed in the practice of the invention. Examples of suitable desiccants include the alkylene glycols such as ethylene glycol, diethylene glycol, triethylene glycol, and the like. Other desiccants which can be employed include normal butyl alcohol, isobutyl alcohol, methyl Carbitol, and the like. The choice of the particular desiccant to be employed will depend upon such factors as the properties of the desiccant itself, the composition and subsequent utilization of the gases being dehydrated, and the desired dew point on the dehydrated gases.

For example, in a system such as that illustrated in the drawing, and wherein it is desired to chill the desiccant and gas to temperature in the order of $-30$ to $-35°$ F., it is preferred to employ a desiccant such as ethylene glycol which does not unduly increase in viscosity upon chilling. Triethylene glycol becomes too viscous at such temperatures for practical operation. On the other hand, when operating at temperatures not much below $+30°$ F., triethylene glycol is a preferred desiccant.

The following example will serve to further illustrate the invention.

EXAMPLE

A stream of natural gas having some higher boiling normally liquid hydrocarbons associated therewith is dehydrated, in a system like that illustrated in the drawings, employing ethylene glycol as the liquid desiccant.

Typical operating conditions for this example are set forth in Table I below.

*Table I*

| Stream or Vessel No | 10 | 13 | 17 | 12 | 14 | 36 | 43 | 47 | 62 | 67 | 29 | 48 |
|---|---|---|---|---|---|---|---|---|---|---|---|---|
| Composition—mols/day: | | | | | | | | | | | | |
| $CO_2$ | 846 | | | | | | | | | | 803 | |
| $N_2$ | 973 | | | | | | | | | | 972 | |
| $C_1$ hydrocarbons | 352,676 | | | | | | | | | | 347,163 | |
| $C_2$ hydrocarbons | 8,193 | | | | | | | | | | 6,483 | |
| $C_3$ hydrocarbons | 2,876 | | | | | | | | | | 591 | |
| $i-C_4$ hydrocarbons | 827 | | | | | | | | | | 2 | |
| $n-C_4$ hydrocarbons | 544 | | | | | | | | | | 0 | |
| $i-C_5$ hydrocarbons | 239 | | | | | | | | | | 0 | |
| $n-C_5$ hydrocarbons | 154 | | | | | | | | | | 0 | |
| $C_6$ hydrocarbons | 180 | | | | | | | | | | 0 | |
| $C_7+$ hydrocarbons | 235 | | | | | | | | | | 0 | |
| Total—MM, s.c.f./day | 140 | | | | | | | | | | 135.7 | |
| Average mol wt | 16.98 | | | | | | | | | | 16.44 | |
| Sp. Gr. @ 60° F | 0.586 | | | | | | | | | | 0.567 | |
| Temperature, °F | 80 | 37 | $-10$ | 100 | 100 | 100 | 120 | 220 | 140 | 140 | 10 | 245 |
| Pressure—p.s.i.g. | 945 | | | | | | | | | | | 933 |
| Ethylene glycol, gal./min | | | | 5 | 3 | 4 | | | | 8 | | |
| Wt. percent EG | | | | 70 | 70 | 68 | | | | 70 | | |
| Wt. percent $H_2O$ | | | | 30 | 30 | 32 | | | | 30 | | |
| Dew Point, °F | sat. | | | | | | | | | | 0 | |

An analysis of a typical sample of the desorbed hydrocarbons withdrawn from regeneration vessel 39 via conduit 62 is set forth in Table II below.

*Table II*

| Component: | | Liquid volume, percent |
|---|---|---|
| Propane—$C_3$ | | 0.10 |
| Isobutane—$i-C_4$ | | 0.40 |
| n-Butane—$n-C_4$ | | 0.90 |
| Isopentane—$i-C_5$ | | 3.30 |
| n-Pentane—$n-C_5$ | | 3.50 |

*Table II—Continued*

| Component: | | Liquid volume, percent |
|---|---|---|
| 2,2-dimethylbutane | $-C_6$ | 0.60 |
| 2-methylpentane | $-C_6$ | |
| 2,3-dimethylpentane | $-C_7$ | 5.80 |
| Cyclopentane | $-C_5$ | |
| 3-methylpentane | $-C_6$ | 2.60 |
| n-Hexane | $-C_6$ | 5.80 |
| Methylcyclopentane | $-C_6$ | 2.50 |
| 3,3-dimethylpentane | $-C_7$ | |
| 2-methylhexane | $-C_7$ | 5.40 |
| 2,3-dimethylhexane | $-C_8$ | |
| 3-methylhexane | $-C_7$ | 4.20 |
| Cyclohexane | $-C_6$ | 3.60 |
| n-Heptane | $-C_7$ | 7.10 |
| Dimethylcyclopentane | $-C_7$ | 2.20 |
| Benzene | $-C_6$ | 1.90 |
| Toluene | $-C_7$ | 4.20 |
| $C_8$ Aromatics | $-C_8$ | 4.00 |
| Octanes+ | $-C_8+$ | 40.90 |
| Quantity | 1000 gallons/day (approx.) | |

Prior to my invention when the desorbed hydrocarbons and the regenerated liquid desiccant were not withdrawn from lower section 58 of regeneration vessel 39 as separate streams, and the level of said two liquid phases was not controlled by the level controls as described above and illustrated in the drawing, said desorbed hydrocarbons accumulated in said section 58 and were ultimately withdrawn with the regenerated desiccant via conduit 67. This reduced the dehydrating efficiency of said regenerated desiccant. On occasion this reduction in efficiency has been great enough to require shutdown of the regeneration vessel to remove said hydrocarbons. When operating in accordance with the invention as described above, these difficulties are eliminated.

It will be evident to those skilled in the art that the invention is not limited to any specific operating conditions per se on the individual processing steps. The actual temperatures, quantities of desiccant, etc. employed will depend upon such factors as the particular desiccant employed, the composition of the gas being dehydrated, the subsequent utilization of the dehydrated gas, the desired dew point on the gas, etc. Those skilled in the art will have no difficulty in selecting suitable operating conditions for a particular gas dehydration operation in view of this disclosure and a study of same.

While the invention has been particularly described as applied to dehydrating natural gas and residue gas from natural gas, the invention is also applicable for the dehydration of other gases. For example, cracked gases from refinery operations, hydrogen, nitrogen, carbon dioxide or any other gas which needs to be dehydrated can be dehydrated and the desiccant regenerated in accordance with the invention.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for the dehydration of gases containing moisture, which process comprises: mixing said gases with a liquid desiccant to form a mixture; cooling said mixture to a temperature sufficient to cause condensation of a portion of said gases and form a condensate; passing said cooled mixture to a phase separation zone and therein separating same into a substantially dry gas phase, a condensate phase, and a wet desiccant phase containing dissolved hydrocarbons; passing said wet desiccant phase to an upper portion of a desiccant regeneration zone; in said regeneration zone, applying sufficient heat to said wet desiccant phase to cause separation of dissolved hydrocarbons and water vapor therefrom to produce a liquid hydrocarbon phase and a regenerated desiccant phase; removing the separated water vapor from an upper portion of the regeneration zone; withdrawing said hydrocarbon phase and said regenerated desiccant phase from said regeneration zone as separate streams; and recycling said regenerated desiccant to said mixing step.

2. A process for the dehydration of gases containing moisture, which process comprises: mixing said gases with a liquid desiccant to form a mixture; cooling said mixture to a temperature sufficient to cause condensation of a portion of said gases and form a condensate; passing said cooled mixture to a phase separation zone and therein separating same into a substantially dry gas phase, a condensate phase, and a wet desiccant phase containing dissolved hydrocarbons; passing said wet desiccant phase to an upper portion of a desiccant regeneration zone; in said regeneration zone, applying sufficient heat to said wet desiccant phase to cause separation of dissolved hydrocarbons and water vapor therefrom to produce a liquid hydrocarbon phase and a regenerated desiccant phase; removing the separated water vapor from an upper portion of the regeneration zone; controlling the amount of said wet desiccant phase passed to said regeneration zone responsive to the liquid level of said regenerated desiccant phase therein; withdrawing said hydrocarbon phase from said regeneration zone responsive to the liquid level thereof in said regeneration zone; and recycling said withdrawn regenerated desiccant phase to said mixing step.

3. A process for the dehydration of a mixture of gases containing moisture, which process comprises: contacting said gases with a liquid desiccant; cooling said contacted gases and desiccant to a temperature sufficient to cause condensation of a portion of said gases and form a condensate; passing said cooled mixture to a phase separation zone and therein separating same into a substantially dry gas phase, a condensate phase, and a wet desiccant phase containing dissolved hydrocarbons including gases and higher boiling normally liquid hydrocarbons contained in said mixture of gases; passing said dry gas phase and said condensate phase to an absorption zone; passing said wet desiccant phase containing said dissolved hydrocarbons into an upper portion of a desiccant regeneration zone; in said desiccant regeneration zone, applying sufficient heat to said wet desiccant to cause separation of dissolved hydrocarbons and water vapor therefrom to produce a regenerated desiccant phase and a hydrocarbon phase; withdrawing water vapor from said upper portion of said regeneration zone; passing hot regenerated desiccant from said regenerated desiccant phase and separated hydrocarbons from said hydrocarbon phase into a lower portion of said regeneration zone; withdrawing said separated dissolved hydrocarbons and said regenerated desiccant as separate streams from said lower portion of said regeneration zone; and recycling said regenerated desiccant to said mixing step.

4. A process for the dehydration of gases containing moisture, which process comprises: mixing said gases with a liquid desiccant to form a mixture; cooling said mixture of gases and desiccant to a temperature sufficient to cause condensation of a portion of said gases and form a condensate; passing said cooled mixture to a phase separation zone and therein separating same into a substantially dry gas phase, a condensate phase, and a wet desiccant phase containing dissolved hydrocarbons including gases and higher boiling normally liquid hydrocarbons contained in said mixture of gases; passing said dry gas phase and said condensate phase together to an absorption zone for further treatment; passing said wet desiccant phase containing dissolved hydrocarbons into an upper portion of a desiccant regeneration zone; in said desiccant regeneration zone, applying sufficient heat to said wet desiccant to cause separation of dissolved hydrocarbons and water vapor therefrom to produce a regenerated desiccant phase and a hydrocarbon phase; withdrawing water vapor from said upper portion of said regeneration zone; passing hot regenerated desiccant from said regenerated desiccant phase and separated hydrocarbons from said hydrocarbon phase into a lower portion of said regeneration zone wherein a phase separation into an upper hydrocarbon phase and a lower regenerated desiccant phase occurs; withdrawing said hydrocarbon phase and said regenerated desiccant phase as separate streams from said lower portion of said regeneration zone; controlling the amount of said wet desiccant phase passed to said regeneration zone responsive to the liquid level of said regenerated desiccant phase in said lower portion of said regeneration zone; controlling the amount of said withdrawn upper hydrocarbon phase responsive to the liquid level thereof in said lower portion of said regeneration zone; and recycling said regenerated desiccant to said mixing step.

5. Apparatus for the dehydration of gases, comprising, in combination: a gas inlet conduit; heat exchange means disposed in said gas inlet conduit; a lean desiccant conduit connected with said gas inlet conduit upstream from said heat exchange means; a separator vessel connected to the downstream end of said gas inlet conduit; a weir disposed within said separator vessel; a first conduit means connected to said separator vessel downstream from said weir for withdrawing from said separator vessel fluids which overflow said weir; a desiccant regeneration vessel comprising substantially an upright shell provided with a lower section, an intermediate section separated from said lower section by a partition having at least one downcomer opening therein, and a tower section disposed above said intermediate section; a first heat exchange coil in said lower section; a second heat exchange coil in said intermediate section; a third heat exchange coil in the upper portion of said tower section; vapor-liquid contact means disposed in said tower section below said third heat exchange coil; an upwardly extending downcomer pipe attached to said partition and surrounding said downcomer opening therein; a second upwardly extending pipe, covered at its upper end by a cap, and surrounding said downcomer pipe with its lower end extending toward but not reaching said partition; a second conduit means connected to the bottom of said separator vessel upstream of said weir and connecting said separator vessel, said third heat exchange coil, and said first heat exchange coil; a third conduit means connecting said first heat exchange coil and said tower section; a first motor valve disposed in said third conduit means; a first liquid level controller operatively connected to said lower section of said regeneration vessel and to said first motor valve; a liquid withdrawal conduit connected to said lower section of said regeneration vessel; a second motor valve disposed in said liquid withdrawal conduit; a second liquid level controller operatively connected to said lower section of said regeneration vessel, at a point above the points of connection of said first liquid level controller, and to said second motor valve; and a fourth conduit means connected to the lower portion of said lower section of said regeneration vessel for withdrawing regenerated desiccant therefrom.

References Cited by the Examiner

UNITED STATES PATENTS

| | | | |
|---|---|---|---|
| 2,327,187 | 8/1943 | Hill | 55—51 |
| 2,725,337 | 11/1955 | Laurence et al. | 55—80 X |
| 2,735,506 | 2/1956 | Glasgow | 55—32 X |
| 2,750,331 | 6/1956 | Meyers. | |
| 2,809,711 | 10/1957 | Allen | 55—165 |
| 2,871,979 | 2/1959 | Scofield | 55—32 |
| 3,105,748 | 10/1963 | Stahl | 55—32 |
| 3,162,515 | 12/1964 | Connors et al. | 55—32 |

REUBEN FRIEDMAN, *Primary Examiner.*

C. N. HART, *Examiner.*